Sept. 6, 1966 R. H. W. KROEKEL 3,270,905
PRESSURE CONTAINER
Filed Dec. 12, 1962 2 Sheets-Sheet 1

INVENTOR.
ROLF HEINZ WERNER KROEKEL
BY
William Frederick Werner
ATTORNEY

Sept. 6, 1966         R. H. W. KROEKEL         3,270,905
PRESSURE CONTAINER

Filed Dec. 12, 1962                              2 Sheets-Sheet 2

INVENTOR.
ROLF HEINZ WERNER KROEKEL
BY
William Frederick Werner
ATTORNEY

United States Patent Office 3,270,905
Patented Sept. 6, 1966

1

3,270,905
PRESSURE CONTAINER
Rolf Heinz Werner Kroekel, West Greenwich, R.I., assignor to Sealol, Inc., Warwick, R.I., a corporation of Delaware
Filed Dec. 12, 1962, Ser. No. 244,038
3 Claims. (Cl. 220—3)

This invention relates to pressure containers and more particularly to novel light weight sheet metal pressure containers especially useful for the storage and transmission of fluids at pressure of several thousands of pounds per square inch, as well as to novel methods for manufacturing such containers.

Heretofore, pressure containers have been characterized by extraordinarily heavy structures usually forged with thick wall sections in the form of cylinders as has been considered essential for confinement of fluids, especially gases, under high pressures, commonly of the order of 2000 p.s.i. for example. Such containers, however, leave much to be desired from the standpoint of weight, and this becomes especially important in aircraft carrying pressurized fluids, for example, in missiles wherein fuel is frequently carried in the form of one or more pressurized fluids.

According to the present invention, novel pressure containers are provided by utilizing an extensible sheet metal tubular member having a plaited outer surface configuration with a plurality of peripherally extending edges or creases alternately pointing inward and outward and expanding such member by applying forces thereto higher than its yield point. Preferably, the expansion is accomplished by applying fluid forces to the tubular member, as by filling it with a gas or liquid under suitably high pressure. This results in expanding the member primarily in its longitudinal or major axial direction, although to a lesser extent in a minor axial or radial direction, and at the same time acting on the generally annular radially extending surfaces between the edges or creases to bow them outwardly and produce a rigid substantially inextensible tubular structure. The structure so produced by stressing its metal in tension beyond the yield point thereof produces a novel pressure container which may thereafter be stressed in use of any pressure less than the yield point, usually a pressure about 20 percent less than that utilized for the initial pressurization.

Furthermore, the pressurization beyond the yield point with many metals acts to work-harden the metal with many alloys and to do so with a desired grain orientation in the direction of greatest stress. This is particularly important when the original expansible tubular member has been assembled by welding together either separate discs or annuli or a helically wound strip or strips, since it accomplishes a unique and necessary hardening of the metal after an annealing step which must follow the welding in many instances.

In addition, the use of a flexible extensible plaited tubular structure which is thereafter expanded into the rigid substantially inextensible pressure container of the invention has further unique advantages, in that it may be readily bent to aline it into a desired configuration before expanding it, or bending into a desired configuration may even be accomplished automatically by utilizing non-symmetrical elements in making up the expansible plaited tubular member.

In order to point out further objects and features of the invention, reference is now made to the following detailed description of preferred embodiments thereof, together with the accompanying drawings wherein:

FIG. 1 is a side view of the unexpanded extensible tubular member used in the present invention;

2

Figure 1:
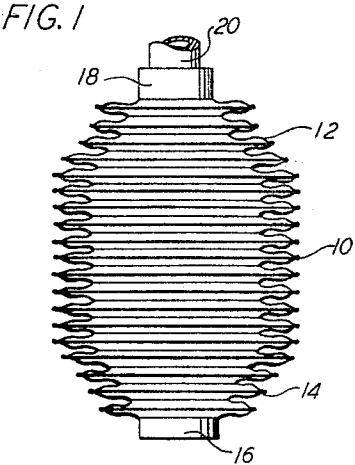
Figure 3:
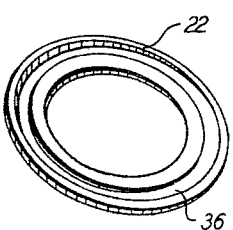
FIG. 3 is an isometric view of an element of the member of FIGS. 1 and 2.
Figure 2:
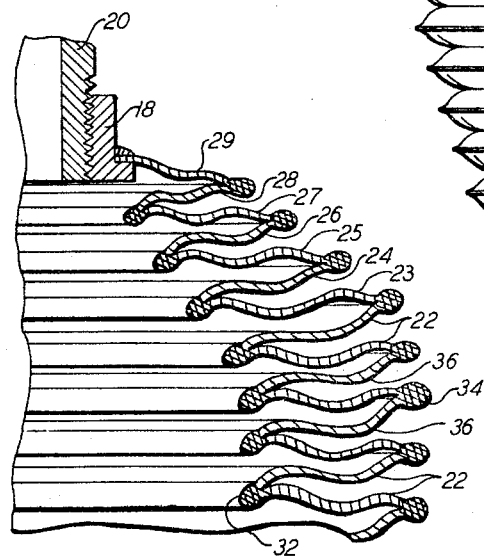
FIG. 2 is an enlarged cross section of a portion of the member of FIG. 1.

Referring first to FIGS. 1 through 3, the flexible extensible tubular member prior to expansion to form the pressure container of the present invention may take any one of a number of forms, for example, it may be cylindrical, conical, spherical, etc. As shown, such member has a cylindrical central portion 10 and integral semispherical end portions 12 and 14. Since the particular container shown is utilized for storage rather than transmission of fluids under pressure, a bottom closure 16 is provided as well as a top closure 18 having a fluid inlet pipe 20. As is best shown in FIGS. 2 and 3, the tubular member is preferably made up from a number of discs or annuli, the cylindrical central portion 10 being assembled from a series of identical annuli or discs 22 and the end portions 12 and 14 being fabricated from a series of annuli or discs 23 . . . 29 decreasing in radius from the central portion 10 to the respective end closure 16 or 18. These annuli or discs which are annular with central bores and suitably shaped in order that a disc may be joined on the outer edge to an adjacent disc on one side and on the inner or central bore edge to an adjacent disc on the opposite side. The joining is preferably an assembling of the discs by welding them alternately at their inner and outer edges at 32 and 34 respectively forming fluid tight seams at such edges or creases. Preferably, too, as shown, the discs or annuli 22 . . . 29 each have an annular corrugation or corrugations 36 to provide an excess of metal available for the subsequent outward bowing as hereinafter more fully described, as well as to avoid interference between adjacent annuli or discs at their inner edges during such bowing.

A wide variety of sheet metal materials may be used for the annuli or discs from which the expansible tubular member is fabricated, depending, of course, on the pressures to be accommodated.

Figure 4:
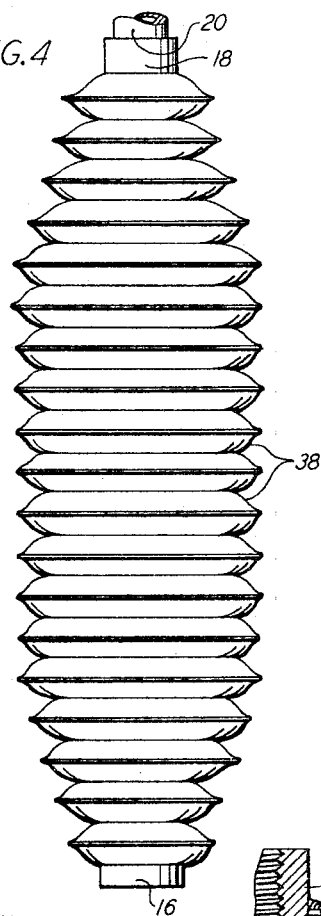
FIG. 4 is a side view of a pressure container according to the present invention.
Figure 5:
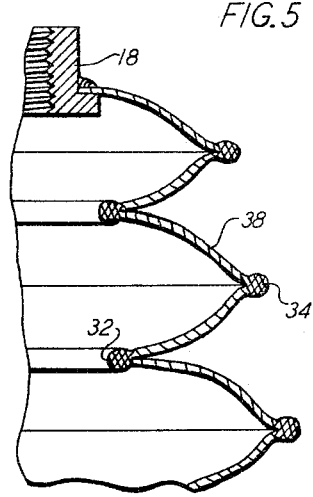
FIG. 5 is an enlarged cross section of a portion of the container of FIG. 4.

According to the present invention, an extensible flexible member, such as that shown in FIGS. 1 and 2 is expanded by connecting its inlet tube 20 to a suitable source of fluid pressure substantially beyond its yield point to produce the novel pressurized vessel of the invention as is shown in FIGS. 4 and 5. As can be seen from a comparison of the original extensible tubular member of FIG. 1, this results in a substantial longitudinal axial expansion, placing the inner welded area or crease 32 in tension and the outer welded area or crease 34 in compression and forming the inner and outer seams and creases and outwardly bowing the annular surfaces as at 38 between such inner and outer areas or creases. A certain degree of radial expansion also takes place since the pressure applied is somewhat beyond the yield point of the metal. The pressure applied to the corrugations 36 generally is sufficient to create a smooth outward bow on all of the discs or annuli 22 . . . 29, since it ensures that sufficient excess metal will be present, at the same time preventing interference between adjacent annuli or discs at their inner edges or creases corresponds generally to their divergence in the expanded container. However, it is not essential that corrugated annuli or discs be used in all cases, simple flat rings or flat discs are entirely satisfactory for certain uses.

Figure 6:
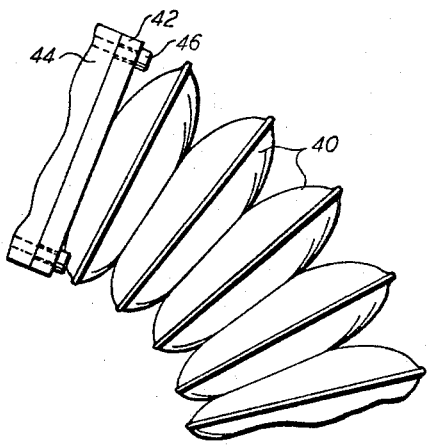
FIG. 6 is a side view of a pressure container modified from that of FIGS. 4 and 5.
Figure 7:
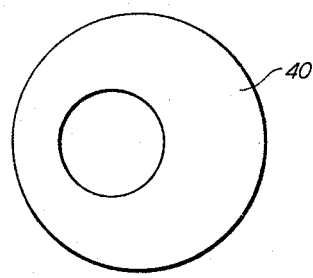
FIG. 7 is a plan view of an unsymmetrical element utilized in making up the container of FIG. 6.

The flexible nature of the tubular member prior to its expansion according to the invention, makes possible the creation of pressure containers, particularly useful for transmitting fluids under high pressure, bent in one or more directions and secured to previously fixed fittings. Furthermore, if desired, the bending of pressure containers according to the invention may be carried out automatically by the selection of appropriate elements. For example, if a flexible member be fabricated of asymmetrical elements or discs 40 such as shown in FIG. 7 wherein the center of inner circular holes or bore is displaced from that of the periphery of the element or discs 40, and the displacement of all such elements is in the same direction, expansion beyond the yield point will cause a bent pressure container to be produced as is shown in FIG. 6. Thus, if, prior to expanding, one end closure 42 of such an unexpanded member be attached to a fixed fitting 44 by suitable bolts 46 and the other end to a similar fixed fitting, a pressure line will be provided between such fittings on expansion beyond the yield point. Furthermore, such will be accomplished without any alinement problems whatsoever.

If the expansible tubular member be expanded freely, it will form a smooth curve according to its asymmetry, such as is also shown in FIG. 6, and such is useful in making up pressure containers in the form of a torus wherein no end closure is needed. Also, if the displacement of the openings relatively to the outer periphery be varied from element to element or disc to disc, various configurations of pressure chambers, such as, for example, a helix, can be produced.

Figure 8:
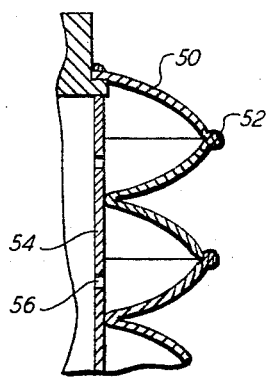
FIG. 8 is an enlarged cross section of a portion of another pressure container modified from that of FIGS. 4, 5 and 6.

In FIG. 8 a somewhat different structure is shown, wherein the annuli or discs are in the form of a V shaped element 50 with its point inward, and welded at 52 at its outer seam or crease. Also, to aid in smooth flow through such a container, a liner 54 of generally cylindrical form may be incorporated, such liner having small holes 56 so that it need not function as a pressure barrier.

Figure 9:
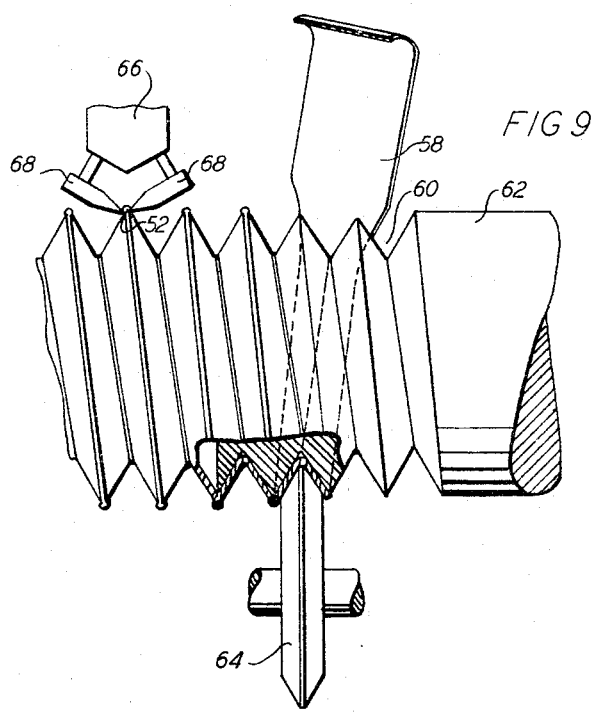
FIG. 9 is a diagrammatic view of apparatus useful in carrying out the manufacture of the container of FIG. 6.

An expansible tubular member which may be expanded into the pressure container of FIG. 8, may be manufactured as diagrammatically shown in FIG. 9. In such showing, a flat strip 58 of sheet metal is pressed into the V shaped screw threads 60 of a rotating member 62 by means of a cooperating wheel 64. The outer adjacent edges of the so formed helix are then welded as at 52 by a suitable electric seam welder 66 comprising a pair of cooperating welding wheels 68. Thus, there is produced a continuous expansible tubular member of indeterminate length, which may be cut off as required for the application of suitable end connections as required, say, for connection to other elements of a pressure system.

Thus, it will be seen that the invention provides novel light weight pressure containers and methods of producing them. Various modifications of the invention, not herein set forth, within the spirit of the invention and the scope of the appended claims will occur to those skilled in this art.

I claim:
1. A substantially inextensible sheet metal pressure container of tubular cross section having a plaited outer-surface configuration with a plurality of peripherally extending creases alternately pointing inward and outward with radially extending outwardly bowed surface therebetween, said container being welded along each of said creases to secure together the edges of adjacent surfaces at said creases thereby establishing pressure resistant seams, said seams having a stress in tension in a direction generally parallel to the longitudinal axis of the sheet metal pressure container substantially beyond its yield point but less than its breaking point by subjecting the sheet metal pressure container to a pressure higher than its operating pressure.

2. A substantially inextensible sheet metal pressure container of tubular cross section having a plaited outer surface configuration with a plurality of peripherally extending creases alternately pointing inward and outward with radially extending outwardly bowed surfaces therebetween, said container comprising a plurality of annuli welded together at their inner and outer edges, the inner and outer welded areas having a tension in a direction generally parallel to the longitudinal axis of the sheet metal pressure container substantially beyond its yield point but less than its breaking point.

3. A substantially inextensible sheet metal container of tubular cross section having a plaited outer surface configuration consisting of a plurality of discs, each disc having a bore and inner and outer circumferential edges, means fastening the outer circumferential edge of each disc to the outer circumferential edge of the adjacent disc on one side thereof, to form an outer seam, and means fastening the inner circumferential edge of each disc to the inner circumferential edge of the adjacent disc on the opposite side thereof at the central bore, to form an inner seam, said outer seams pointing outwardly, said inner seams pointing inwardly, said outer seams having a stress in compression and said inner seams having a stress in tension, in a direction generally parallel to the longitudinal axis of the container, said first mentioned and said second mentioned stress being substantially beyond the yield point of the sheet metal but less than the breaking point of the sheet metal.

References Cited by the Examiner

UNITED STATES PATENTS

| | | | |
|---|---|---|---|
| 781,939 | 2/1905 | Fulton | 220—85 |
| 2,171,973 | 9/1939 | Debor | 220—3 |
| 2,337,247 | 12/1943 | Kepler | 220—3 |
| 2,350,883 | 6/1944 | Duttweiler | 220—5 |
| 2,411,874 | 12/1946 | Golden | 29—454 |
| 2,503,190 | 4/1950 | Branson | 220—3 |
| 2,534,123 | 12/1950 | Hasselhorn | 29—454 |
| 2,534,124 | 12/1950 | Hasselhorn | 29—454 |
| 2,579,646 | 12/1951 | Branson | 220—3 |
| 2,991,900 | 7/1961 | Poorman | 220—3 |
| 3,023,495 | 3/1962 | Noland | 220—3 |
| 3,064,344 | 11/1962 | Arne | 220—3 |
| 3,090,403 | 5/1963 | Kroekel | 29—454 |
| 3,106,414 | 10/1963 | Peters | 29—454 |

FOREIGN PATENTS

| | | |
|---|---|---|
| 866,411 | 5/1941 | France. |
| 24,339 | 1896 | Great Britain. |
| 238,953 | 8/1925 | Great Britain. |
| 55,539 | 8/1935 | Norway. |

THERON E. CONDON, *Primary Examiner.*

EARLE J. DRUMMOND, *Examiner.*

R. H. SCHWARTZ, *Assistant Examiner.*